(12) United States Patent
Oh (10) Patent No.: US 7,975,026 B2
(45) Date of Patent: Jul. 5, 2011

(54) METHOD AND SYSTEM FOR PROVIDING GAME SERVICE BY USING THE INTERNET

(75) Inventor: Seungtaek Oh, Seoul (KR)

(73) Assignee: Neowiz Co., Ltd., Seoul (KR)

( * ) Notice: Subject to any disclaimer, the term of this patent is extended or adjusted under 35 U.S.C. 154(b) by 91 days.

(21) Appl. No.: 12/629,574

(22) Filed: Dec. 2, 2009

(65) Prior Publication Data

US 2010/0144446 A1  Jun. 10, 2010

Related U.S. Application Data

(62) Division of application No. 10/507,789, filed as application No. PCT/KR03/00477 on Mar. 12, 2003, now Pat. No. 7,645,193.

(30) Foreign Application Priority Data

Mar. 13, 2002 (KR) .................................. 2002-13650

(51) Int. Cl.
G06F 15/16 (2006.01)
A63F 9/24 (2006.01)

(52) U.S. Cl. .......................................... 709/218; 463/11

(58) Field of Classification Search .................. 709/203, 709/218–219; 463/11–13
See application file for complete search history.

(56) References Cited

U.S. PATENT DOCUMENTS

| 7,896,745 B2 * | 3/2011 | Youm | 463/43 |
| 2008/0194309 A1 * | 8/2008 | Youm | 463/13 |
| 2010/0144446 A1 * | 6/2010 | Oh | 463/42 |

\* cited by examiner

*Primary Examiner* — J Bret Dennison
(74) *Attorney, Agent, or Firm* — Jones Day (57) ABSTRACT

The present invention relates to a card game adopting new "mission function."
According to the present invention, there is provided a method for providing a card game on the Internet comprising the steps of: (a) providing a display of a game panel to a plurality of players connected to the Internet; (b) inviting the players to the card game upon request of the players; (c) distributing game items to invited players; (d) conducting a random retrieval of at least one mission from a database; (e) checking whether the mission is achieved when the game items are transacted; and (f) settling results of the card game when the card game is over.

8 Claims, 11 Drawing Sheets

METHOD AND SYSTEM FOR PROVIDING GAME SERVICE BY USING THE INTERNET

CROSS-REFERENCE TO RELATED APPLICATION

This application is a divisional application of U.S. patent application Ser. No. 10/507,789, filed Mar. 15, 2005, now U.S. Pat. No. 7,645,193, which application was filed as the U.S. National Stage of International Application No. PCT/KR03/00477, filed Mar. 12, 2003, which claims the benefit of Korean Patent Application No. 2002-13650, filed Mar. 13, 2002. The entireties of these prior applications are incorporated herein by reference.

FIELD OF THE INVENTION

The present invention relates to an Internet game service technique, and more particularly to a method and a system for providing a GO-STOP game service through an Internet, in which a bonus point is given to players when the players complete predetermined missions, which are assigned a GO-STOP game whenever the GO-STOP game is restarted, thereby arousing user's interest.

DESCRIPTION OF THE PRIOR ART

Recently, as communication and network techniques make great strides, various kinds of content services including chatting, Internet society groups, games and shopping malls are provided through the Internet. Among those content services, a demand for game services is greatly increased so that various kinds of game services are rapidly developed and widely spread. In addition, as users enjoying the game service are remarkably increased, free game services are gradually changing into payment game services. With an increase of users enjoying the game services through the Internet, the game services are rapidly commercialized, so portal sites and on-line game service providers develop and provide various kinds of on-line game services.

Among various kinds of web-based games provided through the Internet, GO-STOP games have many users as compared with other web-based games. A GO-STOP game is played with flower cards called "Hwa-too", wherein players get points by collecting certain sets of cards. If a player gets a predetermined number of points, the player can call for "GO" (continuously playing the game) or "STOP" (ending the game). Many people enjoy the GO-STOP game as an off-line amusement.

The GO-STOP game provided through the Internet is substantially identical to a traditional GO-STOP game played off-line except for several rules added to the rules of the conventional GO-STOP game. By providing a GO-STOP game service substantially identical to the traditional GO-STOP game, users can easily use the GO-STOP game service. However, this kind of GO-STOP game does not arouse user's interest, but makes the users playing the GO-STOP game easily feel bored. For this reason, a new GO-STOP game service, which corrects several rules of the conventional GO-STOP game while adding new rules to the rules of the traditional GO-STOP game, is provided to arouse users' interest. However, it takes a long time for users to become adapted for the new GO-STOP game, so the new GO-STOP game forms an entry barrier against the users.

Therefore, it is required to develop new functions for the GO-STOP game capable of arousing user's interest while maintaining the rules of the conventional GO-STOP game played off-line.

SUMMARY OF THE INVENTION

Accordingly, the present invention has been made to solve the above-mentioned problems occurring in the prior art, and an object of the present invention is to provide a method and a system for providing a GO-STOP game service through an Internet, in which a bonus point is given to players when the players complete predetermined missions, which are assigned whenever a GO-STOP game is restarted, thereby arousing user's interest.

In order to accomplish the object, there is provided a GO-STOP game service system for providing a GO-STOP game to a plurality of users through an Internet, the GO-STOP game service system comprising a plurality of computers including a web browser for allowing the users to use the GO-STOP game services, a channel server storing channel lists of the GO-STOP game and game room lists belong to each channel to provide the channel lists and the game room lists to the computers connected to the channel server through the Internet, a GO-STOP game server managing user's information, receiving data transmitted from the computers, which are connected to the GO-STOP server through the Internet, to operate the GO-STOP game, and selectively providing a plurality of missions having a weight as a rule of the GO-STOP game, and a GO-STOP database section for storing personal information of the users, GO-STOP game information, and the missions and the weight assigned to the GO-STOP game.

According to another aspect of the present invention, there is provided a method for providing a GO-STOP game service through an Internet on-line environment including a computer connected to an Internet, a channel server storing channel lists and game room lists, a GO-STOP game server for managing a GO-STOP game, and a GO-STOP database section for storing various data related to the GO-STOP game. The method comprises the steps of providing a channel screen to users, who access to the channel server by using the computer, allowing the users to enter into a GO-STOP game room through the channel screen, starting the GO-STOP game by means of the GO-STOP game server and distributing cards to the users, randomly extracting a mission from the GO-STOP database section by using the GO-STOP game server, proceeding with the GO-STOP game while checking whether or not a certain user completes the mission by using the GO-STOP game server whenever the GO-STOP game server treats the cards selected by the users, and calculating a result of the GO-STOP game by using the GO-STOP game server when the GO-STOP game is finished and providing a screen representing a game result to the users.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 1:
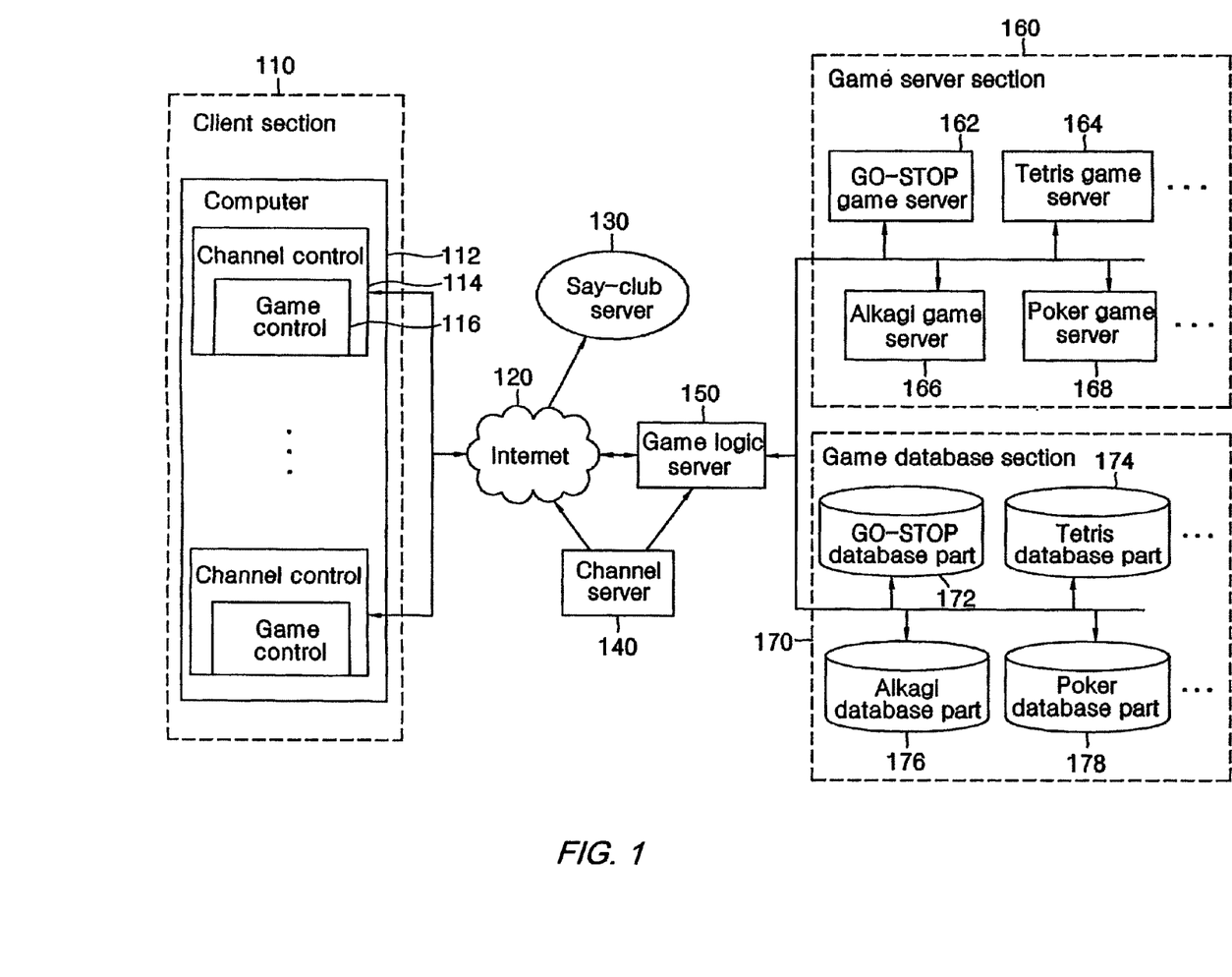
FIG. 1 is a block view schematically showing a GO-STOP game service system by using an Internet according to one embodiment of the present invention.

FIG. 1 is a block view schematically showing a GO-STOP game service system by using an Internet according to one embodiment of the present invention.

The GO-STOP game service system of the present invention includes a client section 110, an Internet 120, a say-club server 130, a channel server 140, a game logic server 150, a game server section 160 and a game database section 170.

The client section 110 includes a plurality of computers 112. A web browser program is installed in each computer 112 to display a web page on a screen of a monitor (not shown) by connecting to the Internet 120. A user, who wants to play a GO-STOP game of the present invention, can select the GO-STOP game in an initial screen of a say-club site by executing the web browser and inputting an address (www.sayclub.com) of a uniform resource locator (hereinafter, simply referred to URL) of the say-club server 130. A channel control 114 and a game control 116, which are transmitted from the say-club server 130 and installed in each computer 112, will be described later in detail with reference to FIG. 2.

The say-club server 130 manages a portal site providing various services, such as games including the GO-STOP game of the present invention, chatting, Internet society groups, messages, and say-malls. The say-club server 130 receives input signals from each computer 112 and transmits corresponding web pages to each computer 112.

In addition, the user is required to register membership to the say-club server 130 in order to play the GO-STOP game. Thus, the user inputs personal information including a name, a resident registration number, identification (ID), a nickname, a secret code, a telephone number, a residential area, and a job into a member registration form of the say-club site. At this time, the user can open or hide the user's personal information. The user can selectively open the user's personal information to user's friends.

In addition, when the user selects the GO-STOP game from a web page provided by the say-club server 130 after connecting to the say-club server 130 by using the computer 112, the channel control 114 and the game control 116 are automatically transmitted into the computer 112 from the say-club server 130 and installed in the computer 112.

The channel server 140 stores various game channel lists including the GO-STOP game, a Tetris game, an Alkagi game (flipping a chess piece using fingers) and a poker game and various game room lists belonging to each game channel. The channel consists of game room lists provided in each game and user lists placed in the game rooms.

The game logic server 150 manages a predetermined part commonly applicable to the plurality of games provided from the say-club server 130. That is, the game logic server 150 manages connection and disconnection of game players, chatting in the game room, and game players. In addition, the game logic server 150 processes data transmitted between the channel control 114 and the game control 116 of each computer 112 and each game server of the game server section 160.

The game server section 160 includes a plurality of servers 162 to 168 for providing various game services from the say-club server 130. That is, the game server section 160 includes a GO-STOP game server 162, a Tetris game server 164, an Alkagi game server 166 and a poker game server 168. The game servers 162 to 168 of the game server section 160 manage games according to game rules, which are variously set depending on sorts of the games, calculate a game result, and sends the game result to the game logic server 150. Accordingly, a rule of the GO-STOP game of the present invention is coded in the GO-STOP game server 162.

The game database Section 170 includes a plurality of database parts 172 to 178 for providing various game services from the say-club server 130. That is, the game database section 170 includes a GO-STOP database part 172, a Tetris database part 174, an Alkagi database part 176 and a poker database part 178. Since the present invention relates to the GO-STOP game, the GO-STOP database part 172 will be described later in detail with reference to FIG. 3.

Figure 2:
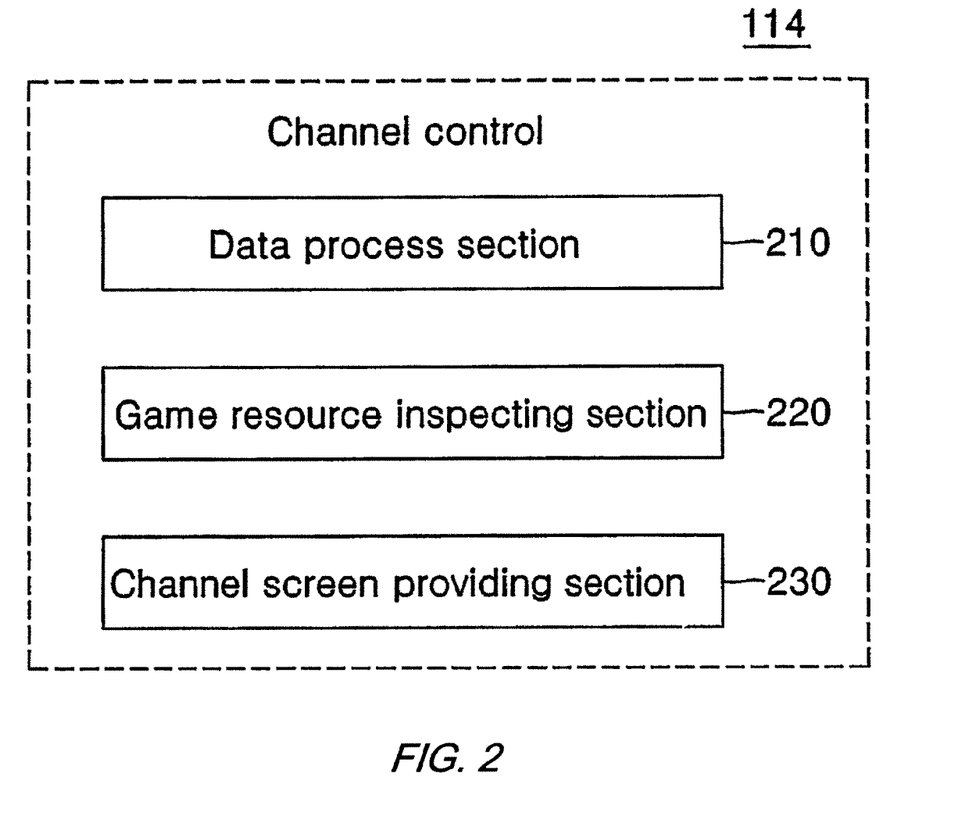
FIG. 2 is a block view schematically showing an internal structure of a channel control according to one embodiment of the present invention.

FIG. 2 is a block view schematically showing an internal structure of TJE channel control 140 according to one embodiment of the present invention.

The channel control 114 of the present invention includes a data processing section 210, a game resource inspecting section 220 and a channel screen providing section 230.

Referring to FIGS. 1 and 2, the data processing section 210 receives data when the user invites other users to a certain game or a certain game room in the web page of the say-club server 130 or transmits data inputted by the user using the game control 116 into the game logic server 150. In addition, the channel control 114 carries out a work corresponding to data received in the data processing section 210.

Data transmitted from the say-club server 130 is sent to the data processing section 210 through a data transmitting/receiving program called "session". The session receives data from the say-club server 130 and transmits data to the channel control by formatting data in such a way that data are processed in the channel control 114. At this time, if the channel control 114 installed in the computer 112 is not executed, the session executes the channel control 114 before transmitting data to the channel control 114.

The game resource inspecting section 220 compares versions of the channel control 114 and the game control 116 installed in the computer 112 with versions of channel control 114 and the game control 116 of corresponding games provided from the say-club server 130. If the versions are different from each other, renewed channel control 114 and game control 116 are transmitted into the computer 112 from the say-club server 130 and installed in the computer 112.

A channel screen providing section 230 provides present channels of a corresponding game and a list of game rooms on a screen of a monitor of the computer 112. After the channel control 114 and the game control 116 are initially installed or renewed in the computer 112, the channel control 114 is connected to the channel server 140 so as to receive a list of the channels and game rooms. Then, the channel control 114 creates a channel screen by using the list of channels and the game rooms received in the channel screen providing section 230.

On the other hand, if the user establishes a new room in the channel screen or enters into a present game room while the channel control 114 are providing the channel screen to the user by connecting to the channel server 140, the channel control 114 releases a connection with respect to the channel server 140 and makes the connection to the game logic server 150. Although it has been described that the channel control 114 is connected to the game logic server 150 and disconnected from the channel server 140, the truth is that the computer 112 of the user is connected to the game logic server 150 and disconnected from the channel server 140.

The channel control 114 connected to the game logic server 140 executes the game control 116 in match with the game selected by the user. The game control 116 executed by the channel control 114 provides a game screen to the computer 112 of the user, transfers data regarding the game inputted by the user to the channel control 114 and sends data, which is transmitted from the game control 116, to the corresponding game server through the game logic server 150.

Figure 3:
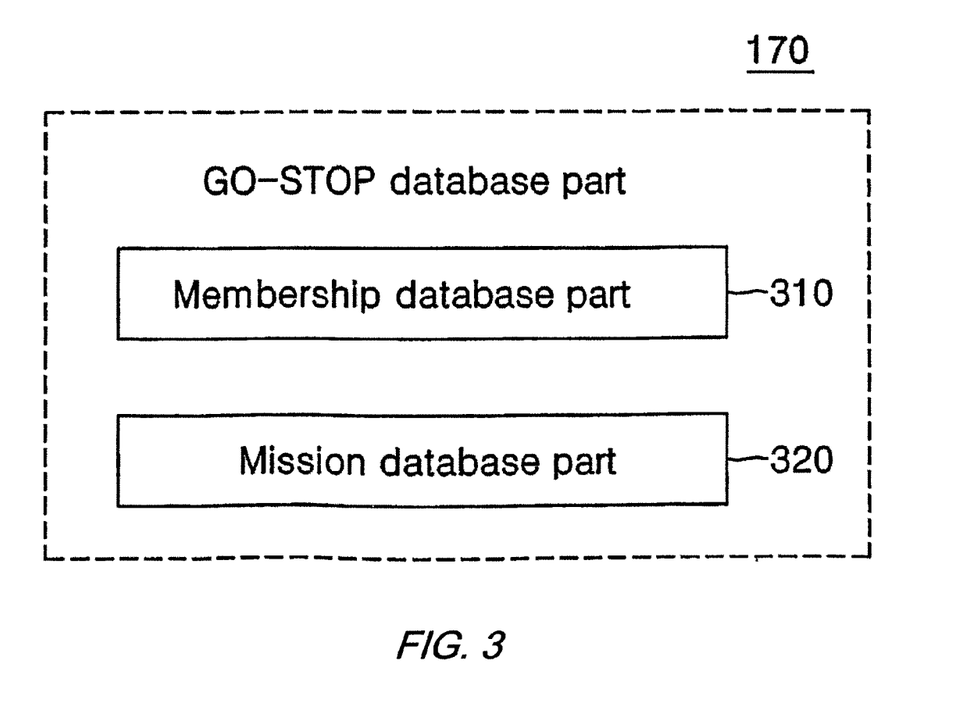
FIG. 3 is a block view schematically showing an internal structure of a GO-STOP database part according to one embodiment of the present invention.

FIG. 3 is a block view schematically showing an internal structure of the GO-STOP database part 172 according to one embodiment of the present invention.

The GO-STOP database part 172 of the present invention includes a membership database part 310 and a mission database part 320.

The membership database part 310 stores personal information and game information regarding members accessed to the GO-STOP game server 162. That is, game information regarding the GO-STOP game, such as GO-STOP money, level, percentage of victories, and disconnection during the game is stored in the membership database part 310 together with personal information of the members, who access to the GO-STOP game server 162.

The mission database part 320 stores sorts of missions according to the preferred embodiment of the present invention and a probability of weight assigned to each mission. Thus, when the GO-STOP game server 162 assigns a mission to each GO-STOP game, the mission is randomly extracted from the various missions stored in the mission database part 320 through the game logic server 150. A point of the mission is extracted based on a predetermined probability value. That is, the game logic server 150 newly stores data in the GO-STOP database part 172 and reads out data stored in the GO-STOP database part 172. Generally, the data storing work and the data reading work are carried out by means of a database management system (DBMS).

According to the present invention, various missions are newly provided to the GO-STOP game. The missions are randomly provided to the GO-STOP game whenever the GO-STOP game is restarted. For example, if the player gets a certain set of cards, bonus money is given to the player. The bonus money is calculated through multiplying weight of the mission by a point value.

Table 1 shows sorts of the missions according to the preferred embodiment of the present invention.

TABLE 1

| Sort of mission | Description of Mission | Display of mission |
| --- | --- | --- |
| Blank | None | Bomb being exploded |
| Chung-dan | Collect chung-dan cards | Three cards of chung-dan |
| Hong-dan | Collect hong-dan cards | Three cards of hong-dan |
| Cho-dan | Collect cho-dan cards | Three cards of cho-dan |
| Godori | Collect Godori cards | Three cards of Godori |
| January | Collect a set of four January cards | A set of four January cards |
| February | Collect a set of four February cards | A set of four February cards |
| March | Collect a set of four March cards | A set of four March cards |
| April | Collect a set of four April cards | A set of four April cards |
| May | Collect a set of four May cards | A set of four May cards |
| June | Collect a set of four June cards | A set of four July cards |
| July | Collect a set of four July cards | A set of four July cards |
| August | Collect a set of four August cards | A set of four August cards |
| September | Collect a set of four September cards | A set of four September cards |
| October | Collect a set of four October cards | A set of four October cards |
| November | Collect a set of four November cards | A set of four November cards |
| December | Collect a set of four December cards | A set of four December cards |
| Yul | Collect yuls of March, June and July cards | Three cards corresponding to the mission |
| Mixing | Collect yuls of October and December cards and a tti of June card | Three cards corresponding to the mission |
| Two-pi | Collect yul of September card and two-pi of November and December cards | Three cards corresponding to the mission |

The terms used in Table 1 are identical to the terms used when playing the GO-STOP game in off-line. The sorts of the missions will not be further described below.

According to the GO-STOP game of the present invention, the mission is randomly assigned to each session of the GO-STOP game after all players have done the play, one time. That is, after three players have drawn one of cards from their hand to match with mate cards placed on a table, the mission is randomly assigned. In other words, the GO-STOP game server 162 randomly provides the mission after three players have drawn one of their cards on the table at their turn.

Although it is described that the mission is assigned after three players draw one of cards on the table one time, the mission can be assigned when the GO-STOP game is started or after three players have drawn cards on the table two or three times.

If a player, who has completed the mission, wins the GO-STOP game, bonus money is given to the player through multiplying predetermined weight by scores (points×point value) obtained by the player. Bonus money is a kind of cyber money, which is only used in the GO-STOP game of the present invention.

Table 2 shows a probability of weight corresponding to a level of the game room according to one embodiment of the present invention.

TABLE 2

|     | 1st level | 2nd level | 3rd level | 4th level | 5th level | 6th level | 7th level | 8th level |
|-----|-----------|-----------|-----------|-----------|-----------|-----------|-----------|-----------|
| X 2 | 40% | 30% | 20% | 10% |     |     |     |     |
| X 3 | 30% | 30% | 30% | 25% | 30% |     |     |     |
| X 4 | 30% | 30% | 20% | 20% | 25% | 30% |     |     |
| X 5 |     | 10% | 20% | 20% | 20% | 25% | 30% |     |
| X 6 |     |     | 10% | 10% | 10% | 20% | 25% | 30% |
| X 7 |     |     |     | 10% | 10% | 10% | 20% | 25% |
| X 8 |     |     |     |     | 5%  | 10% | 14% | 20% |
| X 9 |     |     |     |     |     | 5%  | 10% | 15% |
| X 10|     |     |     |     |     |     | 1%  | 10% |

Referring to Table 2, the probability of weight is predetermined corresponding to the level of the game room. As is understood from Table 2, a weight value assigned to the mission is lowered as the level of the game room is degraded and the weight value is increased as the level of the game room is upgraded. In addition, a probability value in each level is decreased as the weight value is increased. Of course, a weight value corresponding to the levels of the game rooms can be set different from the weight value shown in Table 2.

The level is a term representing a game skill of the players. The level of the player can be upgraded if the player obtains predetermined GO-STOP money. According to the present invention, eight levels (from $1^{st}$ level to $8^{th}$ level) are provided. As the level is higher, money assigned to one point is increased. For example, the $1^{st}$ level (beginner) gets money of 500 won per one point, the $2^{nd}$ level (unskilled person) gets money of 1000 won per one point, the $5^{th}$ level (knight) gets money of 4000 won per one point and the $8^{th}$ level (king) gets money of 50000 won per one point. The beginner, unskilled person, knight and king represent names of the levels.

In order to upgrade the player's level, the player has to purchase an entry ticket by paying predetermined amount of GO-STOP money assigned to each level. In addition, the player cannot enter into the game room established in channels above players' level. The player only can enter into the game room established in channels below player's level.

Figure 4:
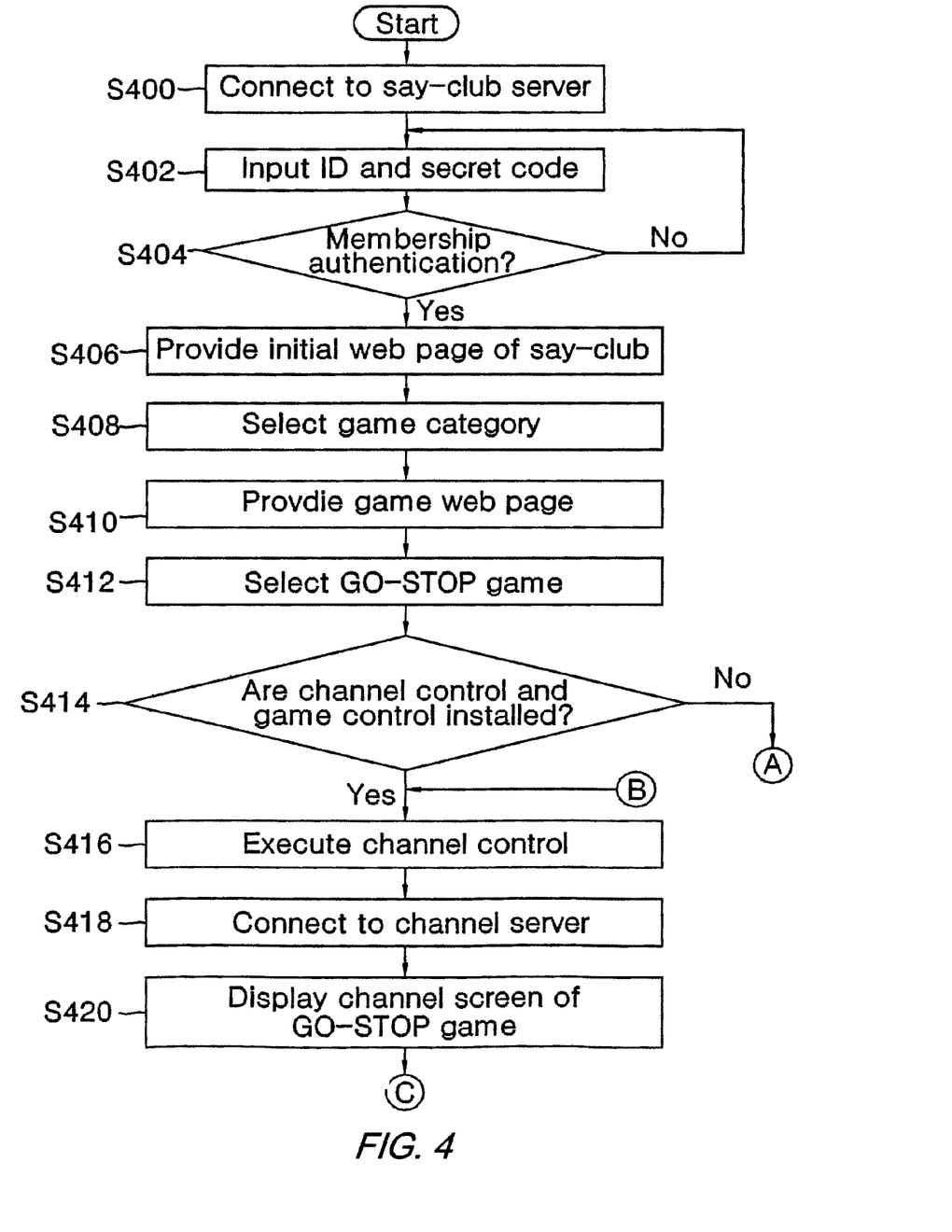
FIG. 4 is a flow chart showing a procedure for receiving a channel screen for a GO-STOP game according to one embodiment of the present invention.

FIG. 4 is a flow chart showing a procedure for receiving a channel screen for the GO-STOP game according to one embodiment of the present invention.

The user makes a connection to the say-club server 130 through the Internet 120 by using the computer 112 (S400). Then, the user inputs an ID and a secret code in a membership authentication screen provided by the say-club server 130 (S402). The say-club server 130 carries out a membership authenticating work based on the ID and the secrete code inputted by the user (S404). When the membership authenticating work is normally carried through the say-club server 130, an initial web page of the say-club site is displayed on the user's computer 112 (S406). If the membership authentication is failed, the user again inputs the ID and the secret code. In case the user misses the ID or the secret code, the say-club server 130 notifies the ID and the secret code to the user through requesting the user to answer several questions in a separate screen.

The user selects a game category from the initial web page provided by the say-club server 130 in order to play the GO-STOP game according to the present invention (S408). When the user selects the game category, a game web page is provided to the user's computer 112 from the say-club server 130 (S410). Then, the user selects the GO-STOP game among various games including the GO-STOP game, the Tetris game, the Alkagi game and the poker game displayed on the game web page (S412). The user can select the GO-STOP game by clicking a "GO STOP" menu, or a "game direct access" menu, which is linked through a hypertext.

If the user selects the GO-STOP game, the say-club server 130 checks whether or not the channel control 114 and the game control 116, which are basic programs for executing the GO-STOP game, are installed in the user's computer 112 (S414). The channel control 114 and the game control 116 are not installed in the user's computer 112, the channel control 114 and the game control 116 are automatically installed in the user's computer 112, which will be described in detail with reference to FIG. 5.

If the channel control 114 and the game control 116 are installed in the user's computer 112, the channel control 114 is executed (S416). In step 416, the executed channel control 114 connects the user's computer 112 to the channel server 140 (S418). The channel server 140 provides channel lists and game room lists included in each channel to the channel control 114 of the computer 112 connected to the channel server 140, so that the channel control 114 creates a channel screen by using the channel lists and the game room lists and displays the channel screen on a monitor of the user's computer 112 (S420). Then, the GO-STOP game is played, which will be described in detail with reference to FIG. 6.

Figure 5:
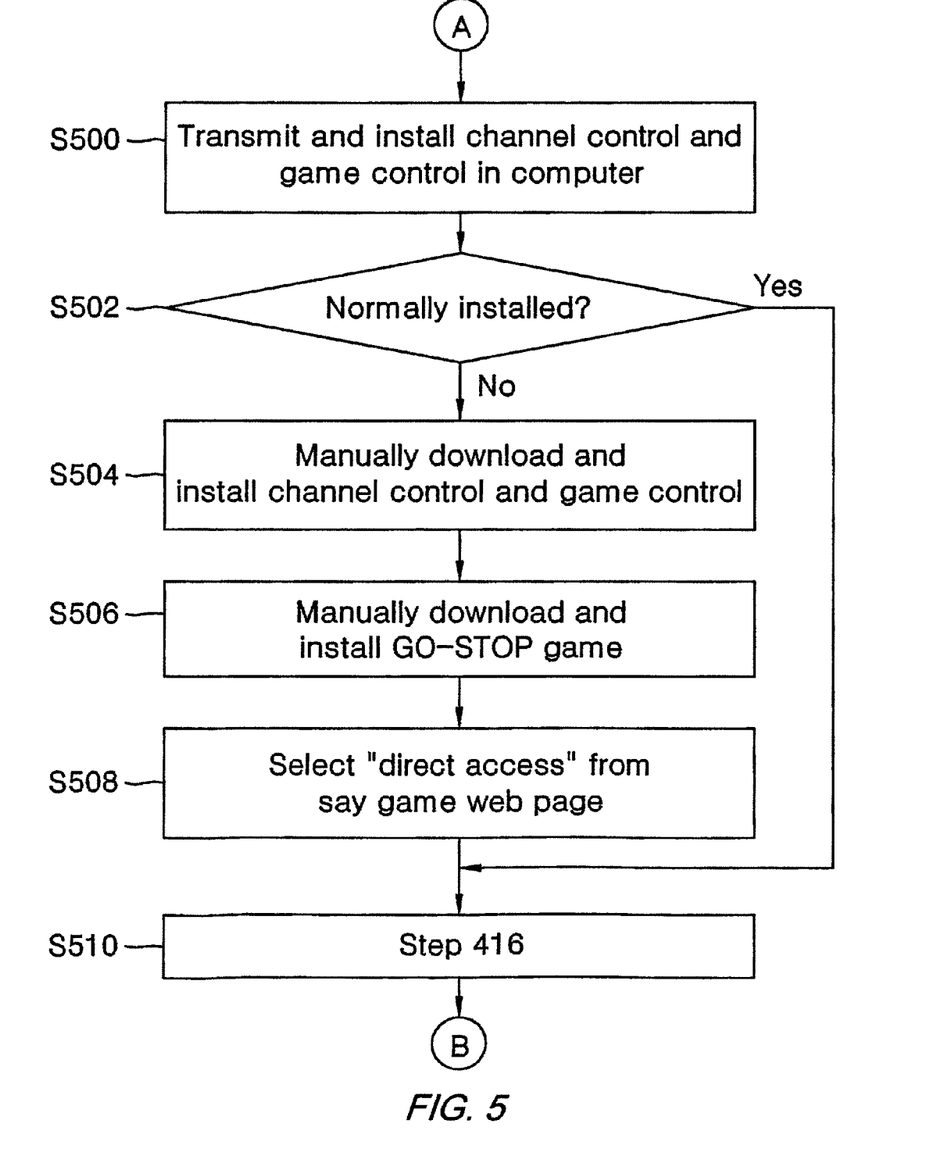
FIG. 5 is a flow chart showing a procedure for installing a channel control and a game control according to one embodiment of the present invention.

FIG. 5 is a flow chart showing a procedure for installing the channel control and the game control 116 in the user's computer 112 according to one embodiment of the present invention.

If the say-club server 130 determines that the channel control 114 and the game control 116 are not installed in the user's computer 112 in step 414, the say-club server 130 automatically transmits the channel control 114 and the game control 116 into the user's computer 112 so that the channel control 114 and the game control 116 are automatically installed in the user's computer 112 (S500). Then, the say-club server 130 checks whether or not the channel control 114 and the game control 116 are normally installed in the user's computer 112 (S502). In case the channel control 114 and the game control 116 cannot be normally installed in the user's computer 112, that is, if an error is generated while transmitting the channel control 114 and the game control 116 into the user's computer 112 or while installing the GO-STOP game program in the user's computer 112, the say-club server 130d sends a message notifying the fail of the installation and provides a message window in the users' computer 112, notifying the user of a manual installation of the channel control 114 and the game control 116 (S504). Thus, the user downloads the channel control 114 and the game control 116 from the say game web page and installs the channel control 114 and the game control 116 in the user's computer 112 (S506). Then, the user selects the "GO-STOP" menu or the "game direct access" menu, which is linked through a hypertext, from the say game web page (S508). If the user selects the "GO-STOP" menu or the "game direct access" menu, the channel control 114 is executed (S510).

On the other hand, if the channel control 114 and the game control 116 are normally installed in the user's computer 112 in step 502, the channel control 114 installed in the user's computer 112 is instantly executed (S510). After executing the channel control 114 in the user's computer 112, the GO-STOP game according to the present invention is played through steps 418 and 420.

Figure 6A:
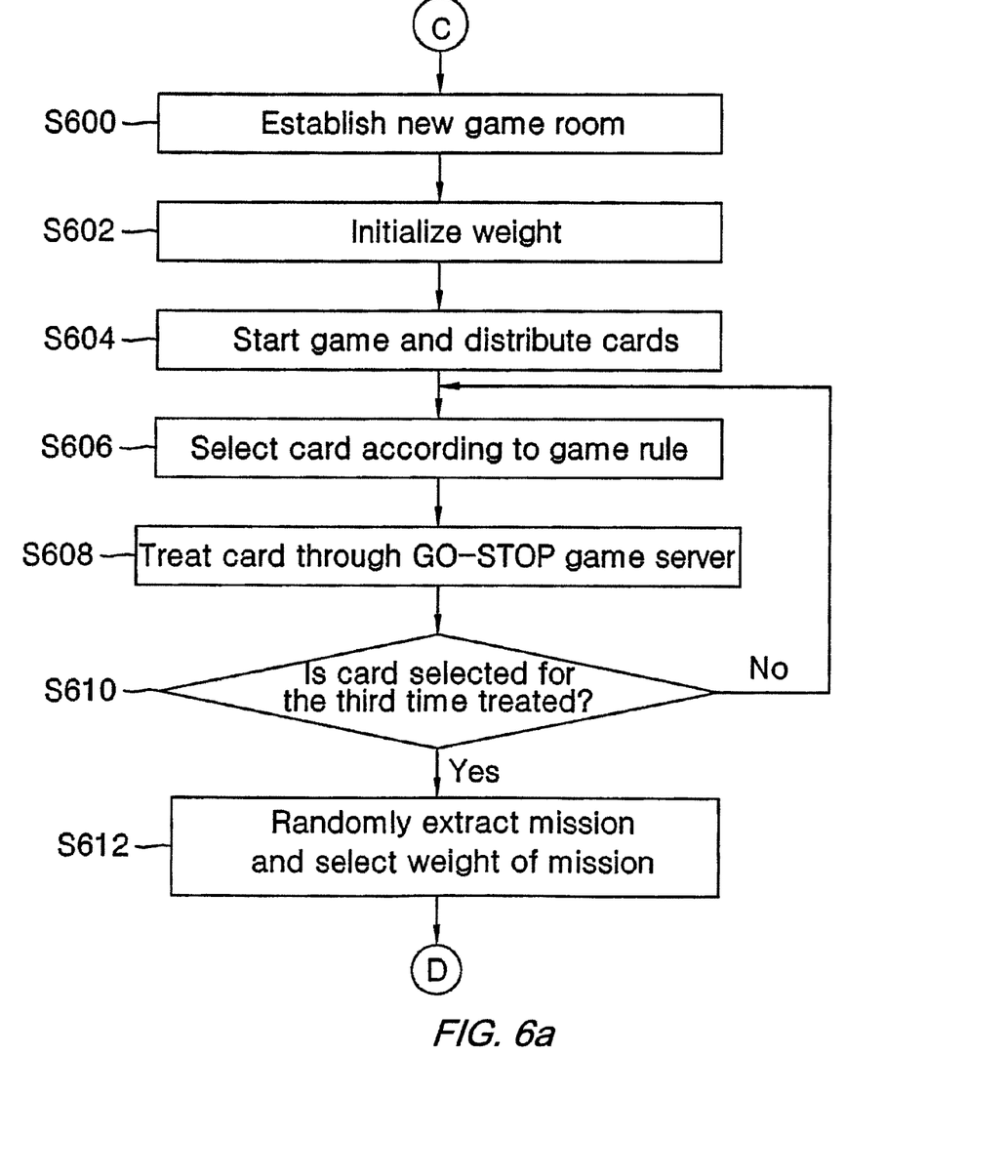
FIG. 6 is a flow chart showing a method for playing a GO-STOP game after a channel screen is provided in a user's computer.
Figure 6B:
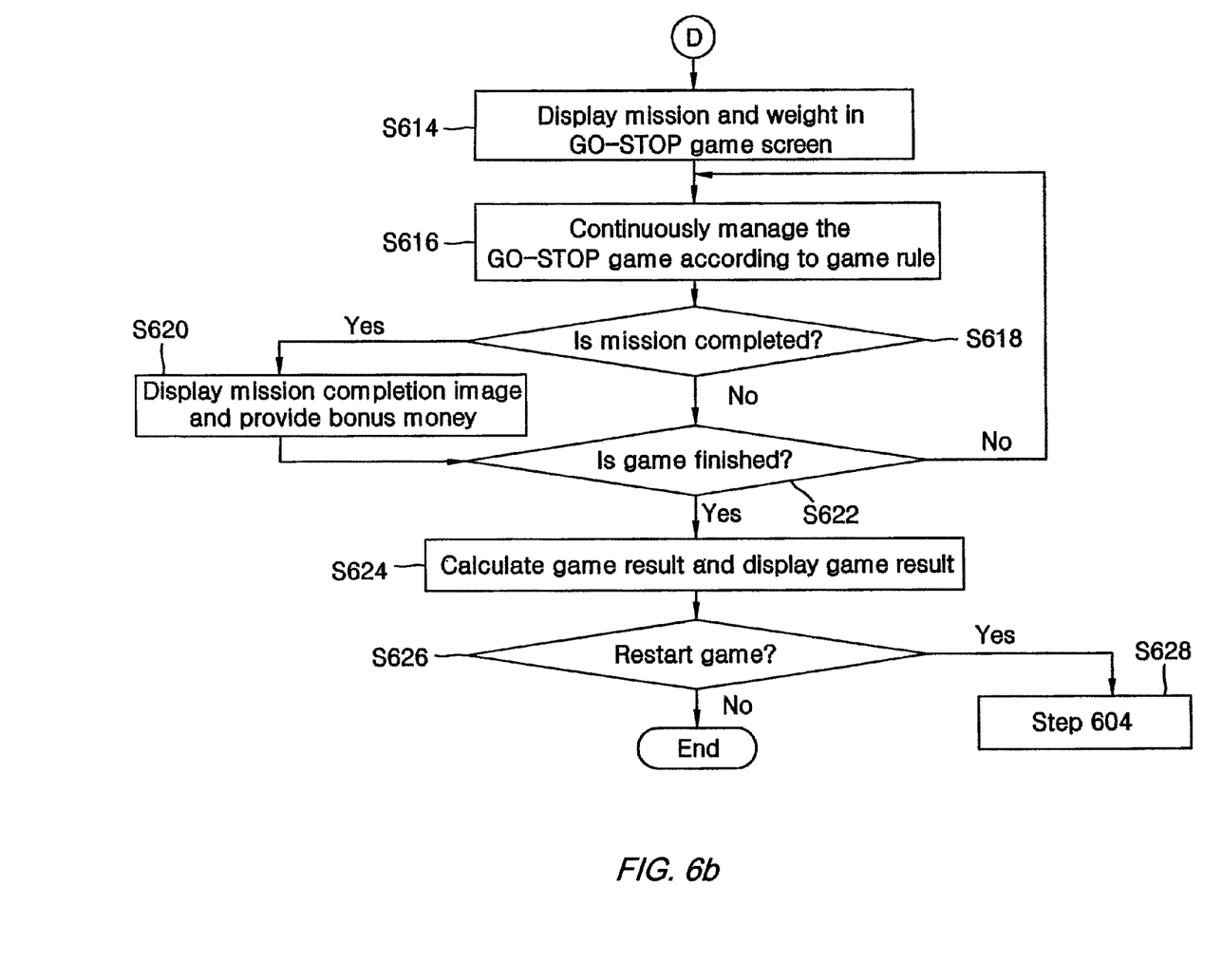

FIG. 6 is a flow chart showing a method for playing the GO-STOP game after the channel screen is provided in the user's computer 112.

The user, who receives the channel screen of the GO-STOP game by connecting to the channel server 140, establishes a new game room (S600). When the user enters into the game room, the user's computer 112 is disconnected from the channel server 140 and connected to the game logic server 150. The user can select the maximum number of users sharing the game room and a title of the game room from a menu. Instead of selecting the title of the game room from the menu, the user can directly input the title of the game room. In addition, the user can set a secret code for the game room so as to limit users entering into the game room. Of course, the user can directly enter into a certain game room, which has been already established, without establishing the game room.

If the user establishes the game room in the game room establishing screen, the GO-STOP game server 162 initializes the probability value of weight of the game room by using the game logic server 150 based on a probability table of weight (referred to Table 1) stored in a mission database part 320 (S602). If the user enters into a newly established game room or into a presented game room, that has been already established, the game control 116 is executed so that the initial screen of the game room is displayed on the user's computer (referred to FIG. 7).

If at least two users enter into the game room, that is, if three players including the user, who makes the game room, are presented in the game room, the GO-STOP game is started so that the cards are automatically distributed to the players (S604). Three players sequentially select cards to draw according to the game rule by using the game control 116 (S606). The GO-STOP game server 162 detects the card drawn by the player and treats the card according to the game rule by using a game control module (S608). Then, the GO-STOP game server 162 determines whether or not the card is treated for the third time (S610). If the card treated by the GO-STOP game server 162 is not the card selected for the third time, the GO-STOP game is continued. If the card treated by the GO-STOP game server 162 is the card selected for the third time, the GO-STOP game server 162 randomly extracts a mission from the mission database part 320 through the game logic server 150 and selects a predetermined weight value according to the probability value, which is initialized in step 602 (S612). When the GO-STOP game server 162 selects the mission and the weight value, an image representing the mission and the weight value is displayed on the monitor of the user's computer 112 (referred to FIG. 8) (S614).

After the mission and the weight value are displayed on the monitor of the user's computer 112, the GO-STOP game server 162 continuously manages the GO-STOP game according to the game rule (S612). Then, the GO-STOP game server 162 checks whether or not the mission is completed whenever treating the cards selected by the players (S618). If the mission is completed, an image representing the completion of the mission is provided to all players and the player, who completes the mission, receives bonus money, which is calculated through multiplying the weight value by the point value assigned to the game room (referred to FIG. 9) (S620). In case the GO-STOP game server 162 determines that the mission is not completed in step 618, or step 620 has been carried out, the GO-STOP game server 162 checks whether or not the GO-STOP game is finished while treating the cards (S622).

If the GO-STOP game server 162 determines that the GO-STOP game is not yet finished in step 622, the GO-STOP game server 162 continuously manages the GO-STOP game according to the game rule by returning to step 616. If the GO-STOP game server 162 determines that the GO-STOP game is finished in step 622, the GO-STOP game server 162 calculates the game result and provides a game finish screen to all players (referred to FIG. 10) (S624).

The finish of the game means that a final card is treated by means of the GO-STOP game server 162 or a certain player calls for "STOP" according to the game rule by obtaining predetermined points.

The players can come out of the game room or select a restart of the GO-STOP game whenever each session of the GO-STOP game is finished (S626). If the player selects the restart of the GO-STOP game, a session of the GO-STOP game is started by returning to step 604 (step 628). If the player selects an "exit", the player comes out of the game room, so the GO-STOP game is finished.

Figure 7:
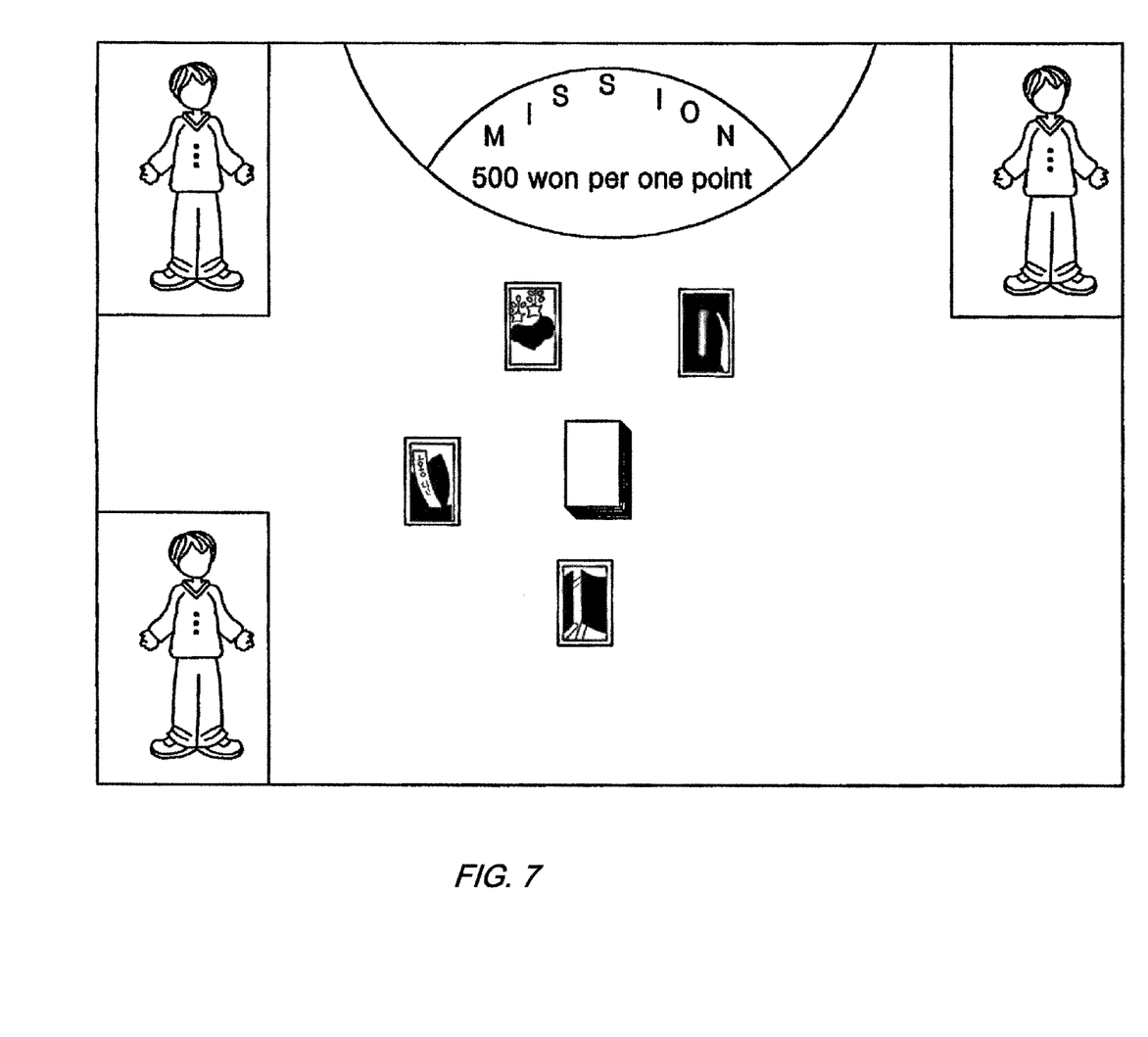
FIG. 7 is a start screen of a GO-STOP game according to one embodiment of the present invention.

FIG. 7 is a start screen of the GO-STOP game according to one embodiment of the present invention.

The GO-STOP game of the present invention can be played only when at least three players are participated in the GO-STOP game. According to the preferred embodiment of the present invention, money per one point is displayed in the start screen according to the level of the game room, but the mission is not displayed in the start screen.

Figure 8:
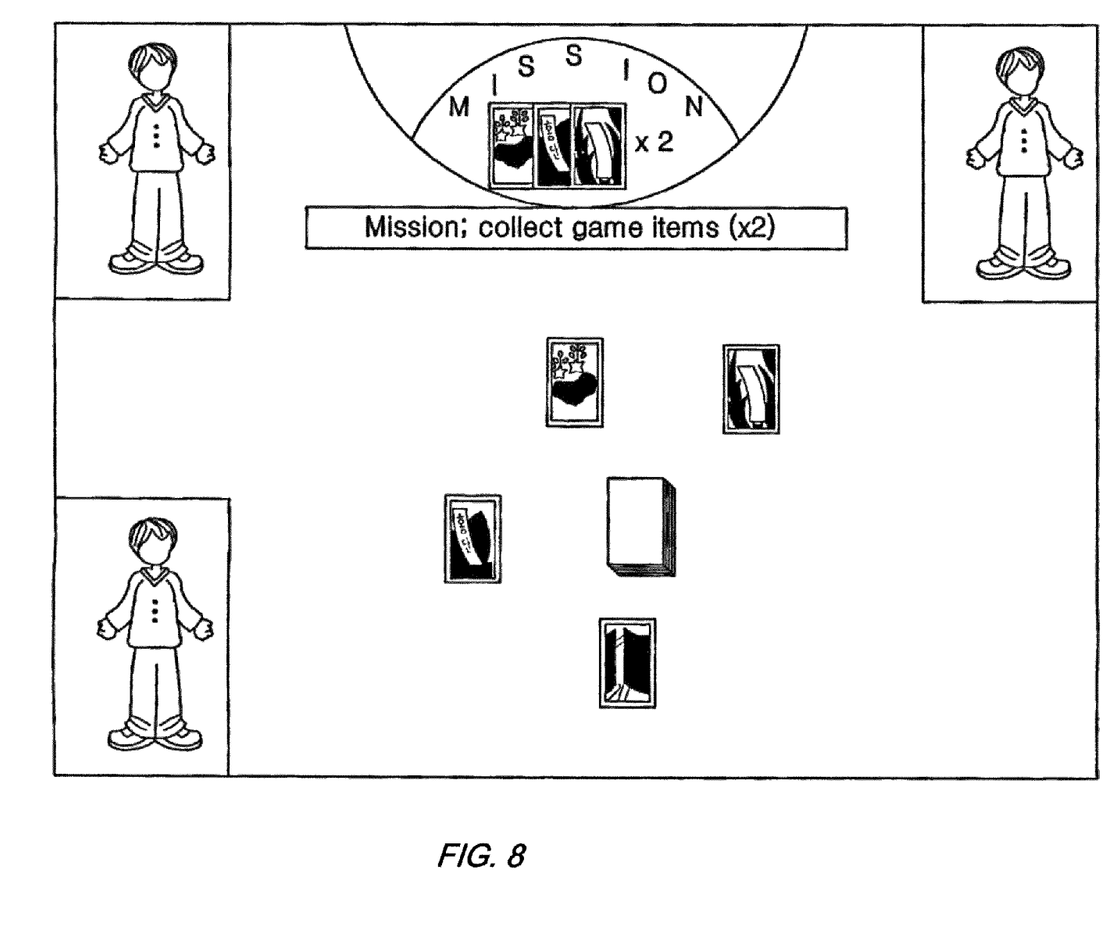
FIG. 8 is a mission screen of a GO-STOP game according to one embodiment of the present invention.

FIG. 8 is a mission screen of the GO-STOP game according to one embodiment of the present invention.

According to the preferred embodiment of the present invention, the mission is assigned when three players sequentially draw a card at their turn, one time. The mission screen shows sorts of cards corresponding to the mission as an image and displays the weight value as a numerical image. In addition, a description of the mission, such as "collect three cards of Godori (×2), is displayed in the mission screen. The mission screen is continuously shown in the user's monitor until the GO-STOP game is finished.

Figure 9:
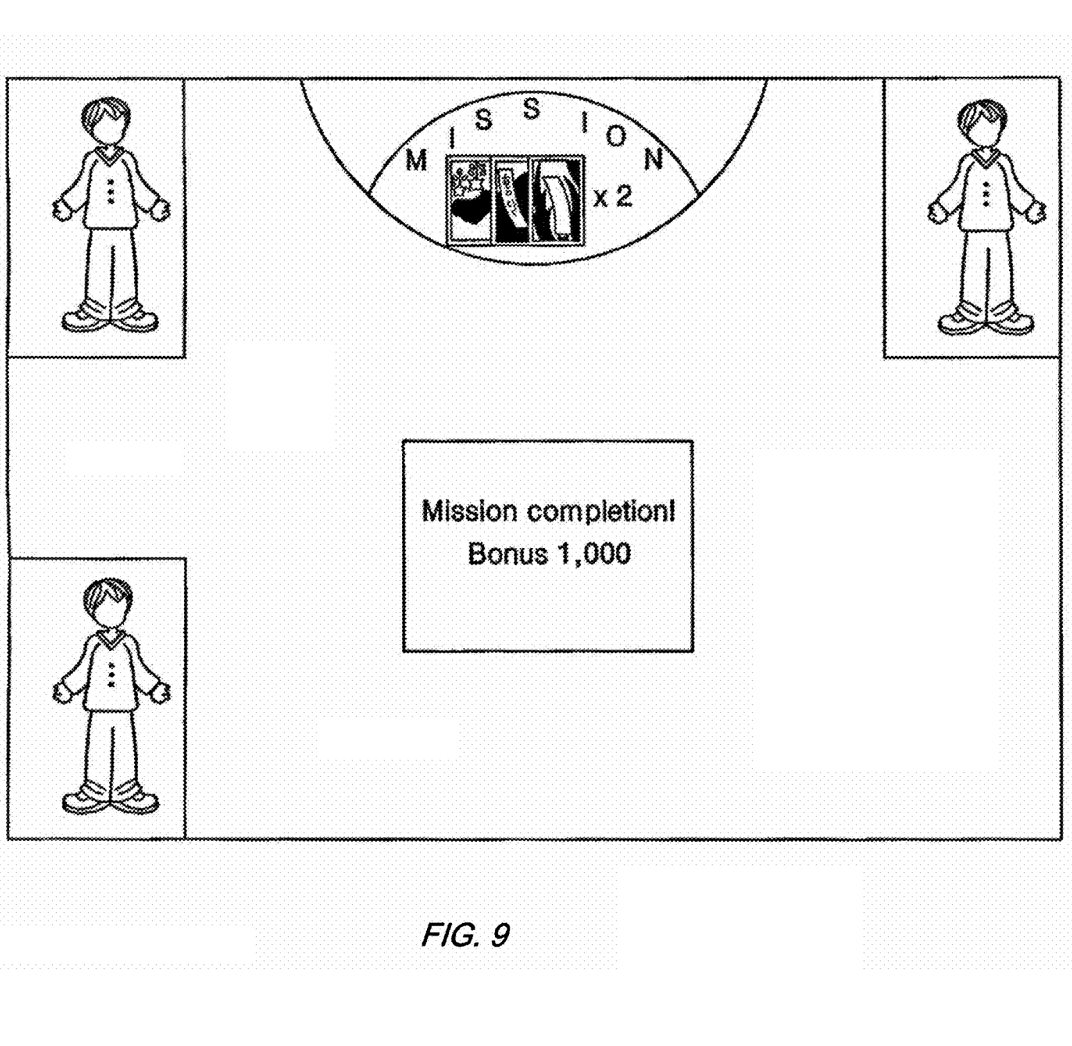
FIG. 9 is an image representing a completion of a mission of a GO-STOP game according to one embodiment of the present invention.

FIG. 9 is an image representing a completion of the mission of the GO-STOP game according to one embodiment of the present invention.

When a certain player completes the mission, an image for congratulating the completion of the mission with representing bonus money thereof is displayed and the player, who completes the mission, receives bonus money.

Figure 10:
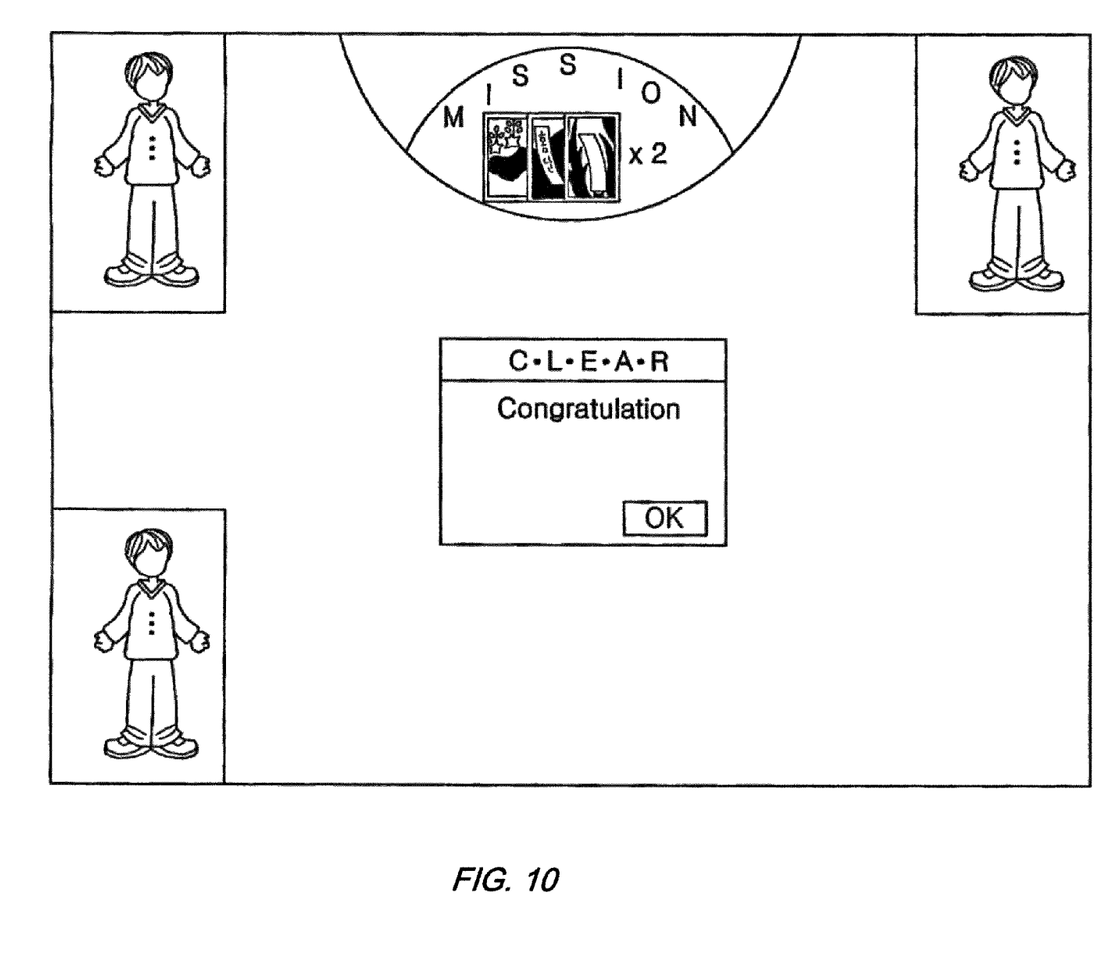
FIG. 10 is an ending screen of a GO-STOP game according to one embodiment of the present invention.

FIG. 10 is an ending screen of the GO-STOP game according to one embodiment of the present invention.

The ending screen displays an amount of money obtained by a winner, a detailed description of points, and an amount of money to be paid by losers. If the winner completes the mission during the GO-STOP game, the winner gets money corresponding to following rule: "money per one point×obtained points×weight value".

As described above, the conventional GO-STOP game available from the Internet makes users feel bored because it adopts game rules identical to the game rules of a traditional GO-STOP game played in off-line. On the contrary, in case the game rules are too much modified from the game rules of the traditional GO-STOP game, or many new rules are added to the rules of the traditional GO-STOP game, the users cannot easily use the GO-STOP game. However, the GO-STOP game according to the present invention provides new functions called "mission" based on the game rules of the traditional GO-STOP game, in such a manner that bonus money, which is calculated through multiplying a weight value assigned to the GO-STOP game by the point value, is given to a player, who has completed the mission, thereby arousing user's interest.

In addition, since the weight value is differently set depending on the level of the game rooms where a higher weight value is assigned to a higher level game, players desire to play in the higher level game room, so the GO-STOP game of the present invention can continuously arouse user's interest.

Although a preferred embodiment of the present invention has been described for illustrative purposes, those skilled in the art will appreciate that various modifications, additions and substitutions are possible, without departing from the scope and spirit of the invention as disclosed in the accompanying claims. Especially, though the present invention is described with respect to the GO-STOP game, the inventive idea can be applied to various card games, e.g., poker.

What is claimed is:

1. A GO-STOP game service system for providing a GO-STOP game to a plurality of users through an Internet, the GO-STOP game service system comprising:
    a plurality of computers including a web browser for allowing the users to use the GO-STOP game services;
    a channel server storing channel lists of the GO-STOP game and game room lists belong to each channel to provide the channel lists and the game room lists to the computers connected to the channel server through the Internet;
    a GO-STOP game server managing users' information, receiving data transmitted from the computers, which are connected to the GO-STOP server through the Internet, to proceed with the GO-STOP game, and selectively providing a plurality of missions having a weight as a rule of the GO-STOP game; and
    a GO-STOP database section for storing personal information of the users, GO-STOP game information, and the missions and the weight assigned to the GO-STOP game.

2. The GO-STOP game service system as claimed in claim 1, wherein the GO-STOP database section includes a membership database part for storing personal information of the users and the GO-STOP game information, which are corrected or renewed through the GO-STOP game server; and
    a mission database part for storing the missions, the weight and a probability value of the weight.

3. The GO-STOP game service system as claimed in claim 1, further comprising a say-club server for a membership registration and a membership authentication of the users, wherein the say-club server stores a predetermined program for proceeding with the GO-STOP game and transmits the predetermined program to the computers to install the predetermined program in the computers.

4. The GO-STOP game service system as claimed in claim 1, further comprising a game logic server reading out data stored in the GO-STOP database section, storing new data, and processing data communicated between the computers and the GO-STOP game server.

5. The GO-STOP game service system as claimed in claim 4, wherein a data communication is carried out between the GO-STOP game server and the GO-STOP database section through the game logic server.

6. The GO-STOP game service system as claimed in claim 3, wherein the predetermined program includes a channel control and a game control.

7. The GO-STOP game service system as claimed in claim 6, wherein the channel control performs a work based on data communicated between the computers and the say-club server and between the computers and the GO-STOP game server, and the channel control provides a channel screen to the computers and renews the game control.

8. The GO-STOP game service system as claimed in claim 6, wherein the game control receives data from the users so as to transmit data to the GO-STOP game server through the channel control or create a GO-STOP game screen.

* * * * *